United States Patent
Tabler

(10) Patent No.: US 7,178,661 B2
(45) Date of Patent: Feb. 20, 2007

(54) OVERHEAD CONVEYER WITH HIGH FRICTION DRIVE TUBE

(76) Inventor: Charles P. Tabler, 7299 Southwind Ter., Cincinnati, OH (US) 45247

( * ) Notice: Subject to any disclaimer, the term of this patent is extended or adjusted under 35 U.S.C. 154(b) by 0 days.

(21) Appl. No.: 11/173,613

(22) Filed: Jul. 1, 2005

(65) Prior Publication Data

US 2007/0000756 A1    Jan. 4, 2007

(51) Int. Cl.
*B65G 37/00*    (2006.01)
(52) U.S. Cl. .................. 198/465.3; 198/465.4
(58) Field of Classification Search ............ 198/465.3, 198/465.4, 678.1, 685, 686, 687, 833, 834
See application file for complete search history.

(56) References Cited

U.S. PATENT DOCUMENTS

| | | | | |
|---|---|---|---|---|
| 3,845,855 A * | 11/1974 | Schwarz et al. | ............ | 198/685 |
| 4,759,439 A * | 7/1988 | Hartlepp | ............ | 198/833 |
| 5,000,308 A * | 3/1991 | Vetter | ............ | 198/678.1 |
| 5,141,094 A * | 8/1992 | Speckhart et al. | ............ | 198/349 |
| 5,143,201 A * | 9/1992 | Speckhart et al. | ............ | 198/502.3 |
| 5,307,920 A * | 5/1994 | Meyer et al. | ............ | 198/335 |
| 5,785,168 A * | 7/1998 | Beall, Jr. | ............ | 198/465.4 |
| 5,806,655 A * | 9/1998 | Tabler | ............ | 198/465.3 |
| 5,919,023 A * | 7/1999 | Owens, Jr. | ............ | 414/155 |
| 6,170,642 B1 * | 1/2001 | Galan et al. | ............ | 198/678.1 |
| 6,293,388 B1 * | 9/2001 | Felter | ............ | 198/465.4 |
| 6,487,988 B1 * | 12/2002 | Good et al. | ............ | 119/57.2 |
| 6,612,424 B2 * | 9/2003 | Merten et al. | ............ | 198/835 |
| 6,802,413 B2 * | 10/2004 | Ito | ............ | 198/465.1 |
| 6,935,490 B2 * | 8/2005 | Trieb | ............ | 198/845 |

\* cited by examiner

*Primary Examiner*—Joe Dillon, Jr.
(74) *Attorney, Agent, or Firm*—Chase Law Firm, L.C.

(57) ABSTRACT

An overhead rotatably powered conveyer drive shaft has ridges inter-engaged with skewed driven wheels mounted for free rotation on a load carrying carriage to trace a helical loci of engagement and improve traction. The ridges are preferably extruded to be parallel. The driven wheels may also have extruded parallel ridges or have an elastic peripheral surface deformed elastically into spaces between adjacent drive shaft ridges during normal conveying to provide the inter-engaging.

17 Claims, 2 Drawing Sheets

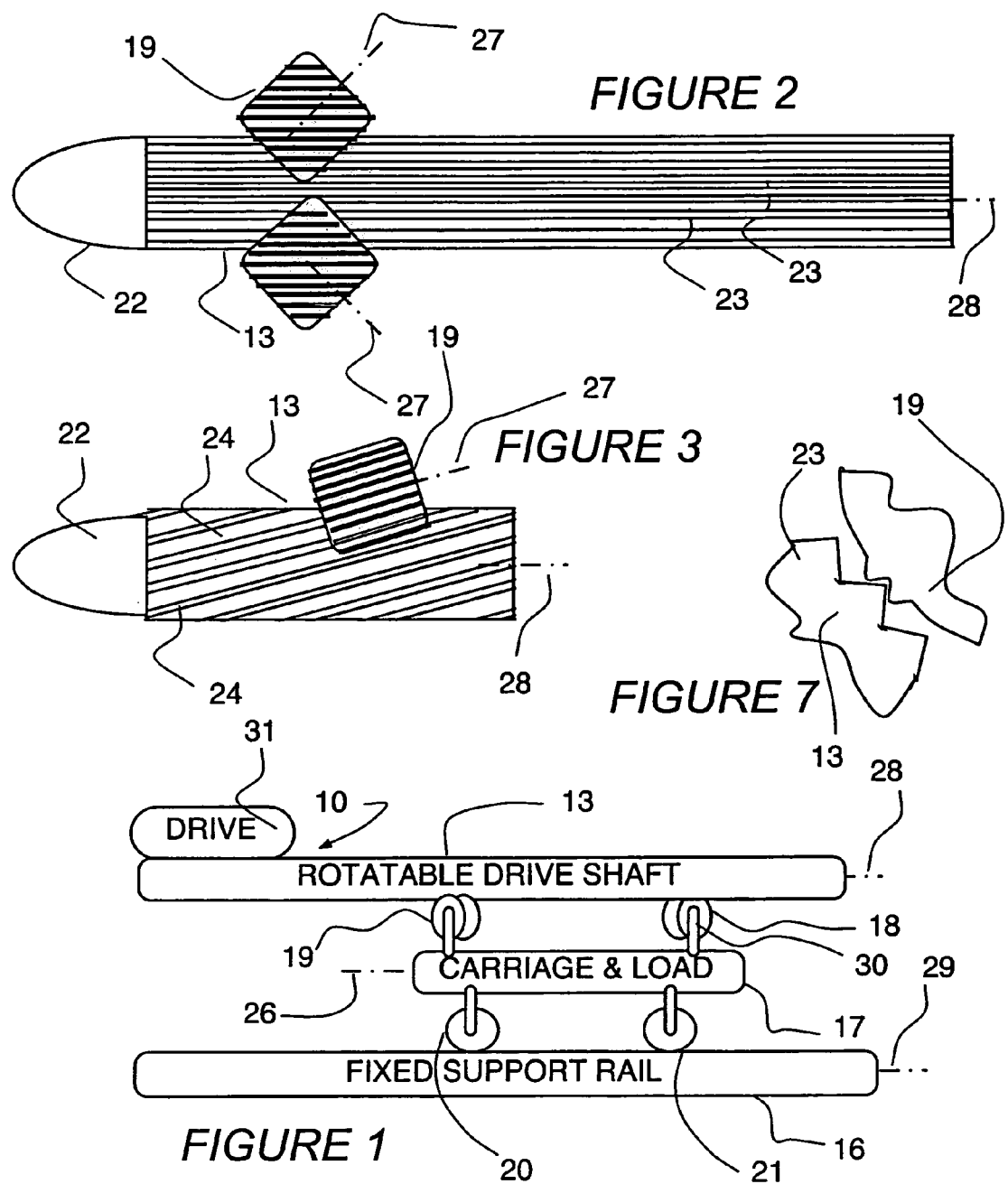

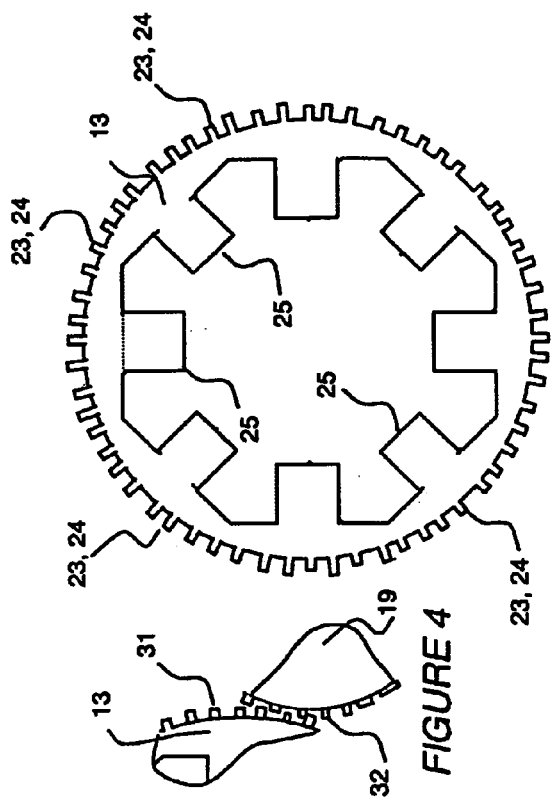
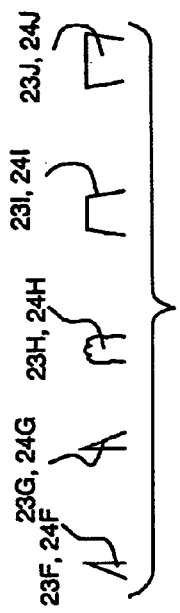

OVERHEAD CONVEYER WITH HIGH FRICTION DRIVE TUBE

BACKGROUND OF THE INVENTION

1. Field of the Invention

The field of the invention is that of overhead conveyers having fixed axis, rotatable drive shafts engaging skewed driven wheels of a carriage to provide the carriage conveying force, wherein the carriage is supported by the drive shaft and/or a fixed support rail.

2. Description of the Related Art

The present invention relates to overhead conveyors of the type disclosed in U.S. Pat. No. 5,806,655 issued Sep. 15, 1998 to Tabler, in U.S. Pat. No. 5,785,168 issued Jul. 28, 1998 to Beall, Jr., in U.S. Pat. No. 4,203,511 issued May 20, 1980 to Uhing, in U.S. Pat. No. 3,164,104 issued Jan. 5, 1965 to Hunt, and in U.S. Pat. No. 3,850,280 issued Nov. 26, 1974 to Ohrnell.

Conventional rotating shaft driven overhead conveyors are limited in the amount of weight they may carry or the incline/decline they may traverse, without the carriage undergoing an uncontrolled slippage, particularly between the drive shaft and the driven wheels, Therefore, overhead conveyors for loads or inclines too great for the rotating shaft driven overhead conveyer are generally of a different type, for example a power and free chain driven conveyor.

Shaft driven overhead conveyors have many advantages over the heavier load type conveyors such as the power and free conveyor; such advantages including quietness, cleanliness, less repair, easy diversion of load carrying carriages, buffering, speed variation along the conveying path, and generally greater flexibility in design.

This well known slippage problem of the rotatable drive shaft type of overhead conveyor has been partially solved by sand-blasting and then anodizing aluminum drive shafts, which adds expensive processing to the manufacturing. Though this is an improvement for some applications, in many cases, it is not enough.

In addition to ascents and to a lesser extent, descents, the problem arises in other circumstances, for example: when a carriage with spaced apart trolleys for a single load (two trolleys being used to carry a greater load than can be carried with a single trolley) passes through a switch. Where a carriage traveling straight on one line, is switched to travel on another line, a trolley passing through the switch may not be powered, so that the rear trolley is the sole drive into the switch and the front trolley is the sole drive out of the switch. In such a situation, the driving power is cut in half through the switch and slippage is more likely to occur, for example when the load is particularly heavy in the high load overhead conveyor of U.S. Pat. No. 5,785,168 issued Jul. 28, 1998, whose disclosure is incorporated herein in its entirety, by reference.

Therefore, there is a need to increase drive friction between the drive shaft and driven rollers of the rotatable drive shaft type of overhead conveyor systems at least at selected locations of a system where a slippage problem is most likely to occur.

SUMMARY OF THE INVENTION

One or more driven wheels are rotatably mounted on the carriage for rotation about one or more drive axes, each of which is non-parallel and non-perpendicular to the shaft axis. Each driven wheel engages a peripheral portion of the drive shaft with sufficient traction so as to form a helical loci of engagement about the periphery of the drive shaft during rotation of the drive shaft about the shaft axis to power the carriage along the conveying path in a direction of the conveying path dependent upon a direction of rotation of the drive shaft. Traction is improved by ridges of the drive shaft inter-engaging with the driven wheel, particularly with an elastic and/or rigid ridged driven wheel. There are advantages of production time and cost when the drive shaft ridges are extruded parallel to the shaft axis during the manufacturing of the shaft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic drawing of a conveyer system according to the present invention embodiment;

FIG. 2 is a view taken on a plane parallel to the axis of rotation of one of the rotatable drive shafts of FIG. 1, showing the drive shaft or a portion thereof and a pair of driven wheels engaged therewith;

FIG. 3 is a view taken on a plane parallel to the axis of rotation of one of the rotatable drive shafts of FIG. 1, showing another drive shaft or another portion or the FIG. 2 drive shaft;

FIG. 4 is an end view, perpendicular to the plane of FIG. 2, showing the engagement between a partially shown driven wheel and a partially shown drive shaft, of FIG. 1, in more detail;

FIG. 5 is a complete end view of the drive shaft taken from the right end as seen in FIG. 2;

FIG. 6A shows a plurality of cross-sectional shapes for the ridges of the drive shaft and/or the driven wheels;

FIG. 6B shows a plurality of cross-sectional shapes for the ridges of the drive shaft and/or the driven wheels; and FIG. 7 is an end view, perpendicular to the plane of FIG. 3, showing engagement between a partially shown driven wheel of elastic material and a partially shown rigid ridged drive shaft, of FIG. 1, in more detail.

DETAILED DESCRIPTION OF THE PREFERRED EMBODIMENTS

Referring now to the drawings, wherein like reference numerals designate identical or corresponding parts throughout the several views.

The overhead conveying system 10 of an exemplary embodiment of the invention may be of any of the types shown in the above-mentioned patents.

By way of a specific best mode example, the embodiment shown in the drawing is of the type wherein a plurality of carriages and loads 17 (one being shown) travel along a conveying direction 26 as they are supported on a fixed support rail 16 by a plurality of freely rotating support wheels 20, 21. The fixed support rail 16 has its longitudinal extent or axis 29 extending parallel to the conveying direction 26.

Each carriage 17 has a plurality of biased mountings 30, for example a combined lost-motion connection and compression spring mount 30 (not shown in detail), which biases freely rotatable driven wheels 18, 19 respectively into engagement with an adjacent one of the rotatable drive shafts 13.

Each of the rotatable drive shafts 13 is mounted on a rigid frame (not shown in this embodiment but shown in the above-referenced patents) for rotation about a shaft axis 28 that is parallel to the axes 26 and 29, which axes 28 and 29 may include curved portions to go up, down or around corners. A drive unit 31, for example having an electric, hydraulic or pneumatic motor and a transmission and controls (not shown herein, but disclosed in the above-referenced patents), rotates the rotatable drive shaft at the desired speed about the shaft axis 28, the rotatable drive shaft may be made up of a plurality of extruded aluminum or synthetic plastic material sections, for example. All of the structure descried so far with specific reference to FIG. 1 is conventional.

According to the embodiment, the drive shaft 13 and preferably also the driven wheels 18, 19 are provided with novel features that improve the traction between them, which is particularly useful for moving heavy loads, moving loads upward, or accelerating/decelerating loads from rest or a steady state speed.

In the embodiment, particularly as shown in FIG. 2 and FIG. 3, the outer peripheral surface of the drive shaft 13 is substantially cylindrical. FIG. 2 shows a portion of the drive shaft 13 of FIG. 1, enlarged to more than twice actual size for showing details of the peripheral outer surface. More particularly, the outer, substantially cylindrical, surface of the drive shaft 13 has a plurality of ridges 23, 24, which ridges are parallel to each other and spaced about the periphery for at least a portion of the length of the drive shaft where increased traction is desired.

The ridges 23, 24 are most preferably extruded. That is, their cross-section perpendicular to the shaft axis (also the extrusion axis) is uniform throughout the length as measured along the direction of the axis of the drive shaft 13 and thereby they are parallel to each other. Additionally, each of the ridges 23 of FIG. 2 lie entirely within a respective flat plane that passes through the axis of the drive shaft 13, which is most preferred as being of least expense to manufacture. Each of the ridges 24 of FIG. 2 lie along a twisted or helical path and accordingly each lies entirely within a respective twisted plane that passes through the axis of the drive shaft 13. Twisting the shaft 13 as it is being extruded may make the ridges 24. Most preferably, the entire shaft 13, not including the nose 22, is unitarily or one piece extruded, although the outer periphery with the ridges 23, 24 may be extruded onto a pre-extruded shaft.

Conventional bullet noses 22 are provided at one or both terminal ends of the drive shafts 13, particularly at an entrance end to lead in the driven wheels 18, 19 and compress their bias springs of the mountings 30. The bullet noses of the embodiment may have their greatest diameter portion of a diameter defined by the peaks of the ridges 23 as in FIG. 2 or optionally equal to the diameter defined by the valleys of the ridges 24 as in FIG. 3, for example.

The driven wheels 19 are formed with ridges 31 that are complementary to the ridges 32 of the drive shaft 13 and they inter-engage, as shown in FIG. 4. While only a set of wheels 19 are shown in FIG. 2, it is to be understood that an identical set of wheels 18 is also present as shown in FIG. 1, but outside of the illustration in FIG. 2.

In FIG. 2, the ridges 23 of the driven wheels 18, 19 are skewed by an angle relative to the axis of rotation 27 of the driven wheels 19 that is equal to the angle of skew of the axis 27 relative to the axis of rotation of the driven shaft 13. With the twisted or helical ridges of 24 of FIG. 3, the driven wheels 18, 19 have their ridges parallel to the axis 27, and the angle of the twist of ridges 24 relative to the shaft axis 28 is the same as the angle between shaft axes 27 and 28. Of course, other complementary angles may be provided and, although not shown, the ridges 23 may be skewed relative to the axis 27 and the ridges 24 may be skewed relative to the axis 28 by the same or a different angle, although such a construction would probably be at an increased cost relative to the disclosed embodiments.

In FIGS. 4 and 5, the ridges 23, 24 have a rectangular cross-section. FIGS. 6A and 6B show a plurality of different cross-sectional shapes for the ridges that may be used in place of one or more of the rectangular ridges of FIG. 4. These shapes may be used in any combination. Ridges 23A, 24A, 23B, 24B are parallelograms that will grip more in one rotational direction than the other. Ridges 23C, 24C, 23D, 24D are rounded and will grip the same in both rotational directions while producing less wear on the driven wheels. Ridges 23E, 24E, 23K, 24K are sharp like serrations, and will grip the same in both rotational directions while producing more grip and more wear on the driven wheels than will the rounded ridges 23C, 24C, 23D, 24D. Ridges 23F, 24F, 23G, 24G are triangles that will grip more in one rotational direction than the other. Ridges 23H, 24H are of a random ill-defined cross-sectional shape. Ridges 23I, 24I are trapezoidal and will grip less than the trapezoidal ridges 23J, 24J.

FIG. 7 shows the shaft 13, which may be constructed in any one of the previously disclosed examples, inter-engaging with a driven wheel 19 that has an elastic outer periphery, which may be a rubber or polyurethane tire extruded on the shaft or a part of a one-piece homogeneous elastic shaft. Elastic, as used herein, refers to a material that elastically deforms (non-permanent deformation) by contact with the ridges of the shaft 13 and then returns to its prior shape when such contact ceases, that is, no permanent set takes place within the normal life of the elements. Although not shown, the shaft may also or alternatively have an elastic outer array of ridges.

Obviously, numerous modifications and variations of the present invention are possible in light of the above teachings. It is therefore to be understood that within the scope of the appended claims, the invention may be practiced otherwise than as specifically described herein.

The invention claimed is:

1. An overhead powered conveyor system for carrying a load along a conveying path, comprising:
    at least one cylindrical drive shaft extending along the conveying path and being mounted for rotation about a shaft axis;
    at least one carriage adapted to support a load;
    a plurality of driven wheels mounted for rotation about a corresponding plurality of driven wheel axes on said carriage, with said driven wheel axes being non-parallel to said drive shaft axis and each other;
    said driven wheels engaging said drive shaft from beneath said drive shaft at positions spaced from each other about a periphery of said drive shaft so that rotation of said drive shaft about said shaft axis will power said carriage along the conveying path in a direction dependent upon direction of rotation of said drive shaft to define a helical loci of engagement about the periphery of said drive shaft; and
    said drive shaft including an axially extruded outer periphery having a plurality of ridges around the outer periphery for at least a substantial portion of the axial length of said drive shaft.

2. The overhead powered conveyer system of claim 1, further comprising:

a fixed support rail extending along the conveying path; and a plurality of support wheels mounted for free rotation to said carriage about respective axes perpendicular to the conveying path, and said support wheels engaging said support rail to carry at least a portion of weight of the load and said carriage independently of said driven wheels and said drive shaft.

3. The overhead powered conveyer system of claim 1, wherein:

said ridges extend in parallel helical paths about the periphery of said drive shaft.

4. The overhead powered conveyer system of claim 1, wherein:

said ridges are parallel to the shaft axis.

5. The overhead powered conveyer system of claim 1, further comprising:

a drive having a rotational power output connected to drive said drive shaft about said shaft axis.

6. The overhead powered conveyer system of claim 5, further comprising:

a fixed support rail extending along the conveying path; and a plurality of support wheels mounted for free rotation to said carriage about respective axes perpendicular to the conveying path, and said support wheels engaging said support rail to carry at least a portion of weight of the load and said carriage independently of said driven wheels and said drive shaft.

7. The overhead powered conveyer system of claim 6, wherein:

said ridges are parallel to the shaft axis.

8. The overhead powered conveyer system of claim 7, wherein:

said driven wheels inter-engage with the ridges of said drive shaft.

9. The overhead powered conveyer system of claim 2, wherein:

said driven wheels inter-engage with the ridges of said drive shaft.

10. The overhead powered conveyer system of claim 5, wherein:

said driven wheels inter-engage with the ridges of said drive shaft.

11. The overhead powered conveyer system of claim 6, wherein:

said driven wheels inter-engage with the ridges of said drive shaft.

12. An overhead powered conveyer, comprising:

a rotatable drive shaft;

a carriage adapted to support a load;

driven wheels mounted for free rotation on said carriage to be skewed with respect to and engaging said rotatable drive shaft to trace a helical loci of engagement; and said drive shaft having a plurality of parallel ridges around its periphery inter-engaging with said driven wheels from above said driven wheels.

13. The overhead powered conveyer of claim 12, wherein said driven wheels have an elastic peripheral surface deformed elastically into spaces between adjacent ones of said ridges during normal conveying to provide the inter-engaging.

14. The overhead powered conveyer of claim 13, further comprising:

a fixed support rail extending along the conveying path; and a plurality of support wheels mounted for free rotation to said carriage about respective axes perpendicular to the conveying path, and said support wheels engaging said support rail to carry at least a portion of weight of the load and said carriage independently of said driven wheels and said drive shaft.

15. The overhead powered conveyer of claim 14, wherein:

said ridges are parallel to the drive shaft axis of rotation.

16. The overhead powered conveyer of claim 15, further comprising:

a drive having a rotational power output connected to drive said drive shaft about said drive shaft axis of rotation.

17. The overhead powered conveyer of claim 12, further comprising:

a fixed support rail extending along the conveying path; and a plurality of support wheels mounted for free rotation to said carriage about respective axes perpendicular to the conveying path, and said support wheels engaging said support rail to carry at least a portion of weight of the load and said carriage independently of said driven wheels and said drive shaft.

* * * * *